(12) United States Patent
Duan et al.

(10) Patent No.: US 11,912,164 B2
(45) Date of Patent: Feb. 27, 2024

(54) ELECTRIFIED VEHICLE WITH BATTERY THERMAL MANAGEMENT SYSTEM CONFIGURED TO ADJUST TEMPERATURE THRESHOLDS BASED ON BATTERY STATE OF HEALTH

(71) Applicant: Ford Global Technologies, LLC, Dearborn, MI (US)

(72) Inventors: Xiaohong Nina Duan, Canton, MI (US); Yanan Zhao, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 407 days.

(21) Appl. No.: 17/485,876

(22) Filed: Sep. 27, 2021

(65) Prior Publication Data
US 2023/0094070 A1    Mar. 30, 2023

(51) Int. Cl.
*B60L 58/26* (2019.01)
*B60L 58/16* (2019.01)
*H01M 10/613* (2014.01)
*H01M 10/625* (2014.01)
*H01M 10/48* (2006.01)
(Continued)

(52) U.S. Cl.
CPC .............. *B60L 58/26* (2019.02); *B60L 58/16* (2019.02); *H01M 10/486* (2013.01); *H01M 10/613* (2015.04); *H01M 10/625* (2015.04); *H01M 10/633* (2015.04); *H01M 10/6563* (2015.04); *B60L 2240/545* (2013.01); *H01M 2010/4271* (2013.01); *H01M 2220/20* (2013.01)

(58) Field of Classification Search
None
See application file for complete search history.

(56) References Cited

U.S. PATENT DOCUMENTS 9,834,099 B2    12/2017 Hughes
11,152,653 B2 * 10/2021 Carlson ............... H01M 10/613
(Continued)

FOREIGN PATENT DOCUMENTS

DE    102013018398 A1    5/2015
WO    2020153032 A1    7/2020

*Primary Examiner* — Todd Melton
(74) *Attorney, Agent, or Firm* — David B. Kelley; Carlson, Gaskey & Olds, P.C.

(57) ABSTRACT

This disclosure relates to an electrified vehicle with a thermal management system for a battery. A corresponding method is also disclosed. An example electrified vehicle includes a battery and a thermal management system configured to thermally condition the battery at one of a plurality of thermal conditioning levels. Each of the thermal conditioning levels corresponds to a respective one of a plurality of battery temperature thresholds. The electrified vehicle further includes a controller. The controller is configured to determine which of the plurality of battery temperature thresholds is met or exceeded based on a temperature of the battery and to command the thermal management system to thermally condition the battery at corresponding one of the plurality of thermal conditioning levels. Further, when a state of health of the battery is outside a predefined range, the controller is configured to adjust each of the plurality of battery temperature thresholds.

20 Claims, 5 Drawing Sheets

(51) Int. Cl.
  *H01M 10/6563* (2014.01)
  *H01M 10/633* (2014.01)
  *H01M 10/42* (2006.01)

(56) References Cited

U.S. PATENT DOCUMENTS

| | | | |
|---|---|---|---|
| 11,152,656 B1* | 10/2021 | Huang | H01M 10/633 |
| 2023/0187734 A1* | 6/2023 | Alobaidi | H01M 10/425 |
| | | | 429/62 |

* cited by examiner

ELECTRIFIED VEHICLE WITH BATTERY THERMAL MANAGEMENT SYSTEM CONFIGURED TO ADJUST TEMPERATURE THRESHOLDS BASED ON BATTERY STATE OF HEALTH

TECHNICAL FIELD

This disclosure relates to an electrified vehicle with a thermal management system for a battery. The thermal management system is configured to adjust a plurality of temperature thresholds based on a battery state of health. A corresponding method is also disclosed.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage traction battery pack typically powers the electric machines and other electrical loads of the electrified vehicle. The traction battery pack may include one or more groupings of interconnected battery cells. The battery cells generate heat during certain conditions, including during charging and discharging operations. Battery thermal management systems may be employed to manage the heat generated by the battery cells.

SUMMARY

An electrified vehicle according to an exemplary aspect of the present disclosure includes, among other things, a battery and a thermal management system configured to thermally condition the battery at one of a plurality of thermal conditioning levels. Each of the thermal conditioning levels corresponds to a respective one of a plurality of battery temperature thresholds. The electrified vehicle further includes a controller. The controller is configured to determine which of the plurality of battery temperature thresholds is met or exceeded based on a temperature of the battery and to command the thermal management system to thermally condition the battery at corresponding one of the plurality of thermal conditioning levels. Further, when a state of health of the battery is outside a predefined range, the controller is configured to adjust each of the plurality of battery temperature thresholds.

In a further non-limiting example of the foregoing electrified vehicle, when the state of health of the battery is outside the predefined range, the controller is configured to adjust each of the plurality of battery temperature thresholds by different amounts.

In a further non-limiting example of any of the foregoing electrified vehicles, when the state of health of the battery exceeds the predefined range, the controller is configured to increase each of the plurality of battery temperature thresholds.

In a further non-limiting example of any of the foregoing electrified vehicles, when the state of health of the battery is below the predefined range, the controller is configured to decrease each of the plurality of battery temperature thresholds.

In a further non-limiting example of any of the foregoing electrified vehicles, the controller is configured to adjust the plurality of battery temperature thresholds based on an adjustment level, and the adjustment level is based on at least one of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

In a further non-limiting example of any of the foregoing electrified vehicles, the adjustment level is based on at least two of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

In a further non-limiting example of any of the foregoing electrified vehicles, the adjustment level is based on each of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

In a further non-limiting example of any of the foregoing electrified vehicles, when the state of health of the battery is outside the predefined range, the controller is configured to adjust each one of the plurality of battery temperature thresholds by different amounts, each one of the different amounts is equal to the adjustment level multiplied by one of a plurality of factors, and each one of the plurality of factors corresponds to the respective one of the plurality of battery temperature thresholds.

In a further non-limiting example of any of the foregoing electrified vehicles, when the state of health of the battery is outside the predefined range, the controller is configured to adjust each one of the plurality of battery temperature thresholds by a common amount in proportion to the adjustment level.

In a further non-limiting example of any of the foregoing electrified vehicles, the predefined mileage and the predefined time thresholds are based on a manufacturer warranty.

In a further non-limiting example of any of the foregoing electrified vehicles, the thermal management system includes a cooling pump, a cooling fan, and a chiller, and, in each of the plurality of thermal conditioning levels, the controller is configured to selectively activate or deactivate a unique combination of the cooling pump, the cooling fan, and the chiller relative to others of the plurality of thermal conditioning levels.

In a further non-limiting example of any of the foregoing electrified vehicles, the plurality of battery temperature thresholds includes at least four battery temperature thresholds, and the plurality of thermal conditioning levels includes at least four thermal conditioning levels.

In a further non-limiting example of any of the foregoing electrified vehicles, the electrified vehicle is a battery electric vehicle.

A method according to an exemplary aspect of the present disclosure includes, among other things, adjusting a plurality of battery temperature thresholds when a state of health of a battery of an electrified vehicle is outside a predefined range, and thermally conditioning the battery at one of a plurality of thermal conditioning levels based on which of the plurality of battery temperature thresholds is met or exceeded. Each of the thermal conditioning levels corresponds to a respective one of a plurality of battery temperature thresholds.

In a further non-limiting example of the foregoing method, the adjusting step includes adjusting each of the plurality of battery temperature thresholds by different amounts.

In a further non-limiting example of any of the foregoing methods, the adjusting step includes increasing each of the plurality of battery temperature thresholds when the state of health of the battery exceeds the predefined range.

In a further non-limiting example of any of the foregoing methods, the adjusting step includes decreasing each of the plurality of battery temperature thresholds when the state of health of the battery is below the predefined range.

In a further non-limiting example of any of the foregoing methods, the adjusting step includes adjusting each of the plurality of battery temperature thresholds based on an adjustment level, and the adjustment level is based on at least one of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

In a further non-limiting example of any of the foregoing methods, the adjusting step includes adjusting each one of the plurality of battery temperature thresholds by different amounts, each one of the different amounts is equal to the adjustment level multiplied by one of a plurality of factors, and each one of the plurality of factors corresponds to the respective one of the plurality of battery temperature thresholds.

In a further non-limiting example of any of the foregoing methods, in each of the plurality of thermal conditioning levels, the thermally conditioning step includes selectively activating a unique combination of a cooling pump, a cooling fan, and a chiller relative to others of the plurality of thermal conditioning levels.

DETAILED DESCRIPTION

This disclosure relates to an electrified vehicle with a thermal management system for a battery. The thermal management system is configured to adjust a plurality of temperature thresholds based on a battery state of health. A corresponding method is also disclosed. An example electrified vehicle includes a battery and a thermal management system configured to thermally condition the battery at one of a plurality of thermal conditioning levels. Each of the thermal conditioning levels corresponds to a respective one of a plurality of battery temperature thresholds. The electrified vehicle further includes a controller. The controller is configured to determine which of the plurality of battery temperature thresholds is met or exceeded based on a temperature of the battery and to command the thermal management system to thermally condition the battery at corresponding one of the plurality of thermal conditioning levels. Further, when a state of health of the battery is outside a predefined range, the controller is configured to adjust each of the plurality of battery temperature thresholds. As such, the controller can selectively prioritize battery state of health or efficiency of the electrified vehicle. Specifically, the state of health of the battery is preserved when the state of health is below the predefined range, and the efficiency of the electrified vehicle can be prioritized when the state of health of the battery exceeds the predefined range. These and other benefits will be appreciated from the following description.

Figure 1:
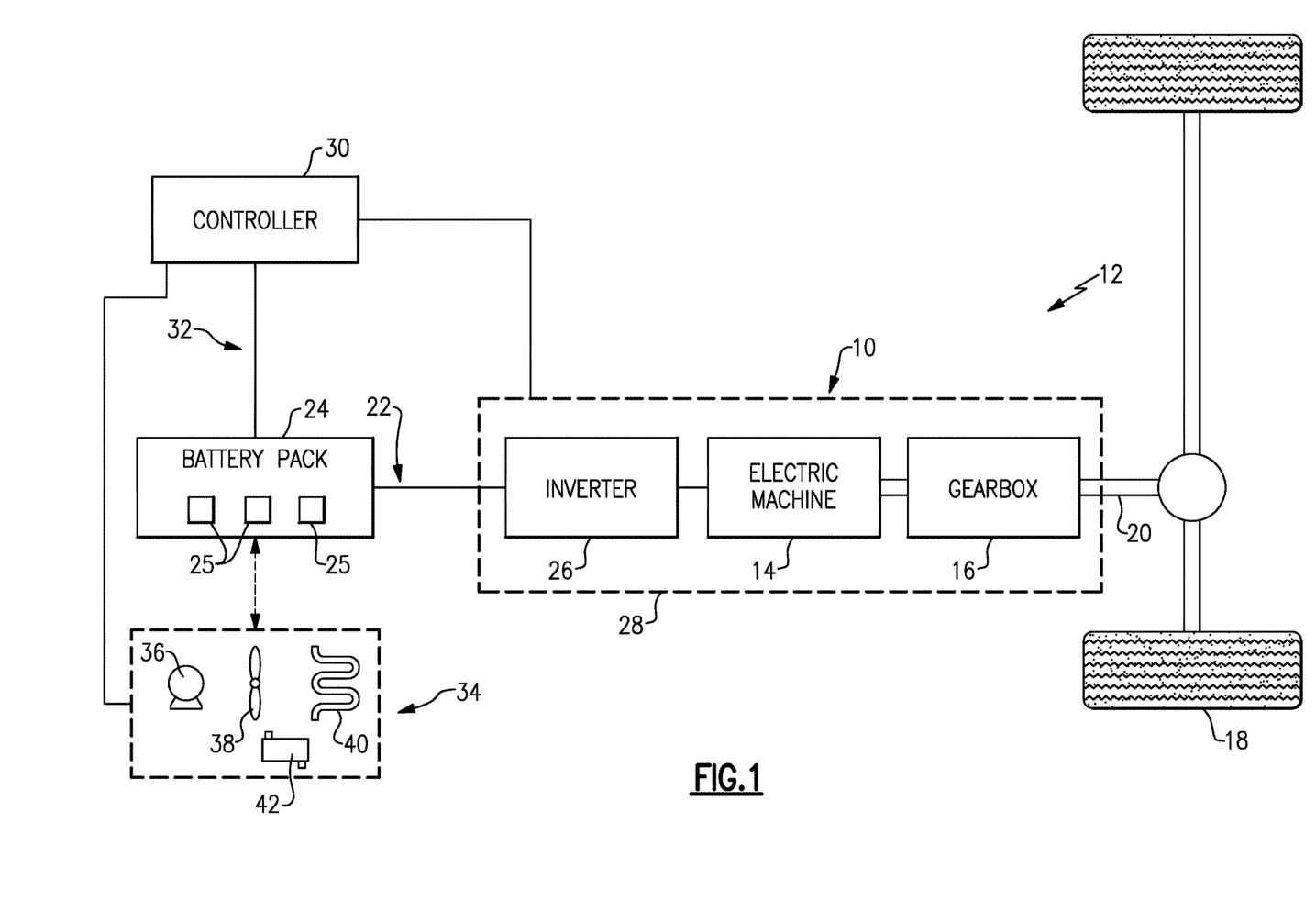
FIG. 1 schematically illustrates a powertrain of an electrified vehicle.

Referring now to the figures, FIG. 1 schematically illustrates a powertrain 10 of an electrified vehicle 12, which is shown as a battery electric vehicle (BEV). Although depicted as a BEV, it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12. Further, this disclosure extends to any hybrid or electric vehicle including full hybrids, parallel hybrids, series hybrids, mild hybrids, and micro hybrids, among others, such as fuel cell vehicles.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 may be provided by a permanent magnet synchronous motor, although other motors may be used. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 (i.e., a "battery") through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., groupings of battery cells commonly known as arrays) capable of outputting electrical power to operate the electric machine 14 and/or other electrical loads of the electrified vehicle 12. Other types of energy storage devices and/or output devices can also be used to electrically power the electrified vehicle 12. The electrified vehicle 12 may also include a charging system for periodically charging energy storage devices (e.g., battery cells) of the battery pack 24. The charging system may be connected to an external power source, such as a grid power source, for receiving and distributing power to the energy storage devices.

The inverter 26 may be an electronic device including IGBTs (insulated-gate bipolar transistors) or other switches adapted to convert direct current (DC) from the battery pack 24 to alternating current (AC). In response to instructions from a controller 30, the inverter 26 may activate one or more of its switches to convert direct current from the battery pack 24 to alternating current for the electric machine 14. Based on a desired torque output, the controller 30 sends one or more instructions to the inverter 26, which in turn is operable to direct an appropriate voltage and frequency of AC current from the battery pack 24 to the electric machine 14.

In addition to communicating with the inverter 26, the controller 30 is configured to monitor and/or control various aspects of the powertrain 10 associated with the electrified vehicle 12. The controller 30, for example, may communicate with the electric machine 14, the battery pack 24, and the inverter 26. The controller 30 may also communicate with various other vehicle components and monitor other vehicle conditions. The controller 30 includes electronics, software, or both, to perform the necessary control functions for operating the electrified vehicle 12.

In one non-limiting embodiment, the controller 30 is a combination vehicle system controller and powertrain control module (VSC/PCM). Although it is shown as a single device, the controller 30 may include multiple controllers in the form of multiple hardware devices, or multiple software controllers with one or more hardware devices. A controller area network 32 (CAN) allows the controller 30 to communicate with the various components of the electrified vehicle 12.

In this example, the battery pack 24 is thermally conditioned by a thermal management system 34, which is configured to cool or heat the battery pack 24, as needed, in response to instructions from the controller 30. The thermal management system 34 includes a plurality of components. Specifically, in this example, the thermal management system 34 includes a cooling pump 36, a cooling fan 38, and a thermal exchange plate 40. The thermal management system 34 also includes a chiller 42 in this example.

Each of the components of the thermal management system 34 is in electronic communication with the controller 30. Further, each of the components of the thermal management system 34 is separately and independently configured to thermally condition the battery pack 24. The controller 30 may selectively activate one or more of the components of the thermal management system 34 to apply a desired level of thermal conditioning, such as cooling, to the battery pack 24. The components of the thermal management system 34 are exemplary. While not shown, the thermal management system 34 includes a number of additional components, including pipes, conduits, couplings, valves, etc.

In the example of FIG. 1, when the cooling pump 36 is activated, a working fluid like refrigerant is configured to flow to the battery pack 24 to thermally manage the battery pack 24. The dashed lines in FIG. 1 represent the flow of working fluid to and from the battery pack 24 via the cooling pump 36. The working fluid may manage the temperature of the battery pack 24 by flowing through the thermal exchange plate 40, which may be mounted adjacent the battery pack 24, in one example. If activated, the chiller 42 may cool the working fluid before it reaches the battery pack 24 to provide additional cooling. The cooling fan 40, when activated, may direct a flow of air relative to the battery pack 24 and/or relative to the thermal exchange plate 40 to provide additional cooling.

The electrified vehicle 12, including the powertrain 10 and other components, shown in FIG. 1 is highly schematic and is not intended to limit this disclosure. Various additional components could alternatively or additionally be employed by the powertrain 10 and/or the electrified vehicle 12 within the scope of this disclosure.

As mentioned, the controller 30 is configured to selectively activate one or more of the components of the thermal management system 34 to apply a desired level of thermal conditioning, such as cooling, to the battery pack 24. In some conditions, no cooling is needed, and thus the controller 30 is configured to deactivate all of the components of the thermal management system 34. In some other conditions, the battery pack 24 requires heat, and the controller 30 is configured to cause the thermal management system 34 to heat the battery pack 24.

Figure 2:
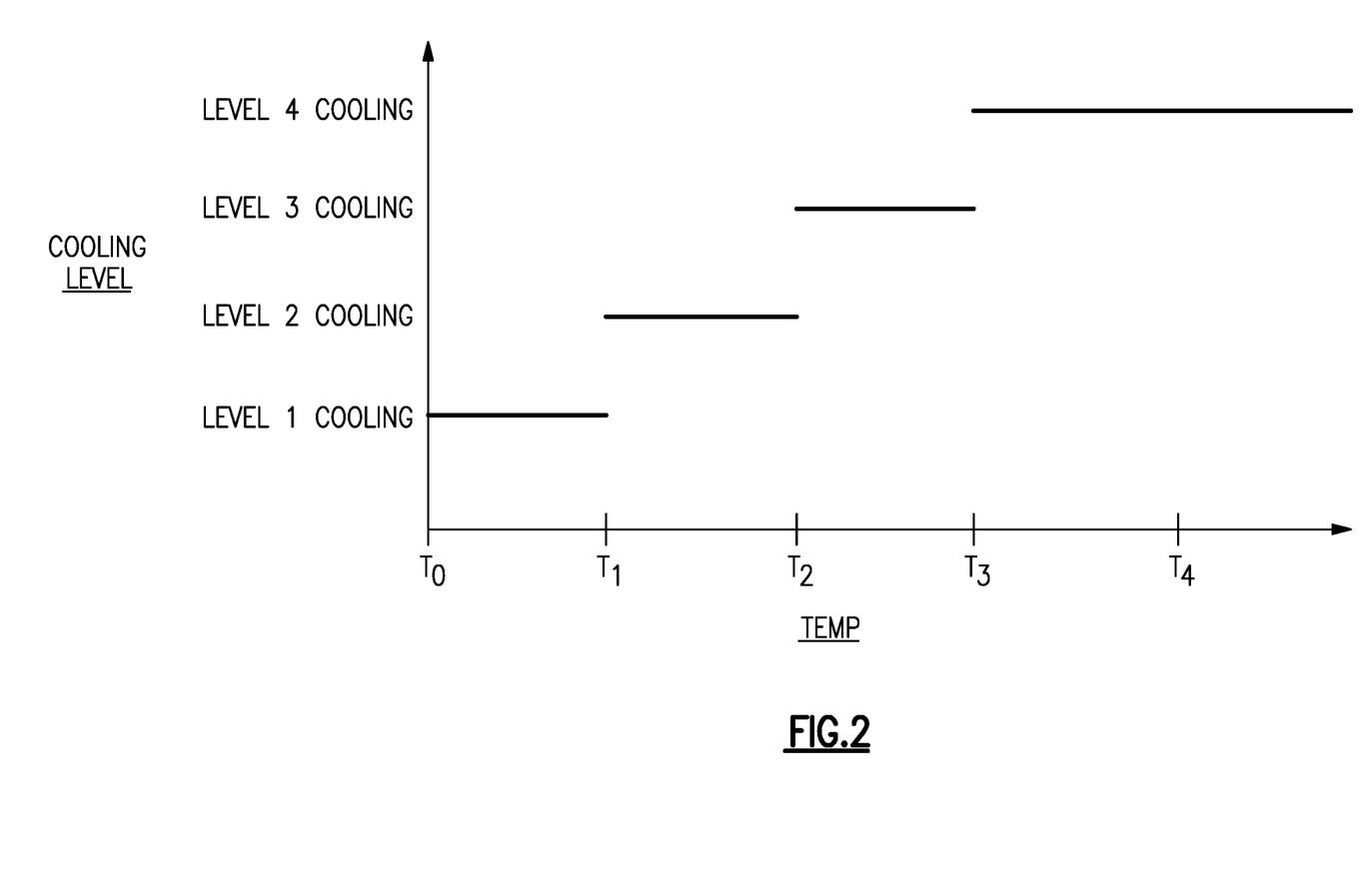
FIG. 2 is a graphical representation of a control scheme for a thermal management system of a battery of the electrified vehicle when a state of health of the battery is within a predefined range.
Figure 3:
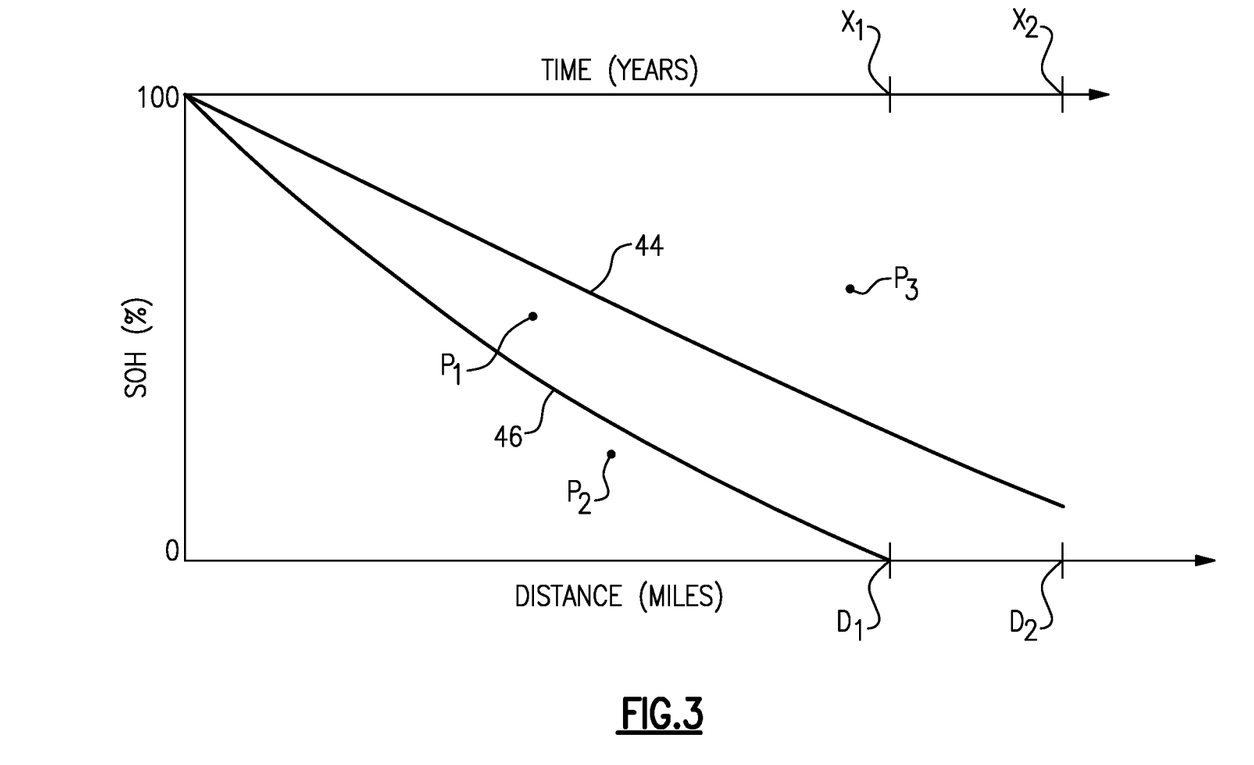
FIG. 3 is a graphical representation of the state of health of the battery relative to time and distance.

FIG. 2 graphically illustrates an example control scheme for the thermal management system 34. The control scheme of FIG. 2 is representative of the manner in which the thermal management system 34 is controlled when a state of health (sometimes abbreviated "SOH") of the battery pack 24 is within a predefined range. The predefined range is a range set by a manufacturer of the electrified vehicle 12 and/or the battery pack 24. The predefined range is a normal operating range and indicates that the battery pack 24 is aging normally. FIG. 3 graphically represents an example predefined range.

In FIG. 3, there are two curves plotted with state of health of the battery pack 24 on the Y-axis relative to two values on the X-axis, which are time and distance driven. The time is in years in this example and the distance driven is in miles in this example. The value for distance driven could also be quantified by operating hours of the battery pack 24.

The two curves plotted in the graph of FIG. 3 are an upper threshold curve 44 and a lower threshold curve 46. The lower threshold curve 46 may be a warranty curve defined by the manufacturer of the electrified vehicle 12 and/or the battery pack 24 as a low-end target for the state of health of the battery pack 24. The lower threshold curve 46 may be representative of the aging of the battery pack 24 when the electrified vehicle 12 is frequently driven in extreme environments, such as in extremely hot or cold locations, or in extreme driving conditions. In this example, the lower threshold curve 46 intersects a value of 0 state of health at a time $X_1$ and a distance $D_1$. In one example, the time $X_1$ is 8 years and the distance $D_1$ is 100,000 miles, which values set by a manufacturer corresponding to a manufacturer warranty of the electrified vehicle 12, in this example. $X_1$ and $D_1$ do not need to correspond to a warranty in other examples, however. Instead of a warranty, the values for $X_1$ and $D_1$ could correspond to other target values.

The upper threshold curve 44 is a curve representative of a target aging of the battery pack 24. Following the upper threshold curve 44 to time $X_2$, which is 10 years in this example, and distance $D_2$, which is 150,000 miles in this example, the state of health of the battery pack 24 still has not reached 0.

In this disclosure, the controller 30 is able to determine a present state of health of the battery pack 24 by considering information from one or more sources. One example source is a capacity of the battery pack 24 when the battery pack 24 is fully charged or has charged for a sufficient time such that the battery pack 24 should be fully charged. In general, state of health of the battery pack 24 is a figure of merit of the condition of the battery pack 24 relative to ideal conditions of the battery pack 24, such as the conditions of the battery pack 24 at the time of manufacture. The controller 30 may determine the state of health of the battery pack 24 using a battery management system. The controller 30 may consider the suitability of the battery pack 24 to perform a given application when making the state of health determination. The state of health of the battery pack 24 may be determined by evaluating or considering one or more of the following parameters: resistance, impedance, conductance, capacity, voltage, self-discharge, ability to accept a charge, number of charge-discharge cycles, age of the battery, temperature of battery during its previous uses, total energy charged and discharged, etc.

In one example, the controller 30 determines that the state of health of the battery pack 24 is at point $P_1$, which is vertically between curves 44, 46, and is thus within the predefined range. As such, the controller 30 instructs the thermal management system 34 according to the control scheme of FIG. 2. In order to determine the state of health of the battery pack 24, such as the location of point $P_1$ on relative to the graph of FIG. 3, the controller 30 may make one or both of a time-based and a distance-based state of health determination. The location of the point may be dictated by the lowest state of health determined using the two strategies. For instance, if a time-based state of health computation would have resulted in $P_1$ being placed above the upper threshold curve 44, and the distance-based state of health computation resulted in $P_1$ being placed between the two curves 44, 46, then the distance-based computation is used.

FIG. 2 plots thermal conditioning levels, which here are cooling levels, on the Y-axis and temperature thresholds of battery pack 24 on the X-axis. In particular, FIG. 2 represents a control scheme when the state of health of the battery pack 24 is within the predefined range. When in the predefined range, the controller 30 is configured to apply one of a plurality of cooling levels depending on the temperature of the battery pack 24. The temperature of the battery pack 24 may be determined using known techniques, such as in response to signals from one or more temperature sensors on or adjacent the battery pack 24.

In FIG. 2, a plurality of cooling levels are shown relative to a plurality of temperature thresholds $T_0$-$T_4$. The thresholds $T_0$-$T_4$ are predefined and stored and/or accessible by the controller 30. In this example, at temperatures below $T_0$, the controller 30 does not activate any components of the thermal management system 34. Below $T_0$, the battery pack 24 does not require cooling and/or is adequately cooled without actively running any of the components of the thermal management system 34, which may be referred to as "natural" cooling.

Once the temperature of the battery pack 24 reaches $T_0$, the controller 30 applies a first level of cooling. In an example, the first level of cooling includes activating only one of the components of the thermal conditions system 34, such as the cooling pump 36.

As the temperature of the battery pack 24 increases, the controller 30 applies different levels of cooling. At each level of cooling, a unique combination of the components of the thermal conditioning system 34 is activated. At each successive cooling level, additional heat is absorbed from the battery pack 24 than in the preceding level. For instance, when the temperature of the battery pack 24 reaches $T_1$, the controller 30 applies a second level of cooling in which another component is activated in addition to or as an alternative to the cooling pump 36. In an example, at the second cooling level, the cooling fan 38 is activated in addition to the cooling pump 36. When the temperature of the battery pack 24 reaches $T_2$, in an example, the controller 30 applies a third level of cooling in which the thermal exchange plate 40 is activated in addition to or as an alternative to the cooling pump 36 and the cooling fan 38. At a battery pack 24 temperature of $T_3$, in an example, the controller applies a fourth level of cooling in which the chiller 42 is activated in addition to or as an alternative to the cooling pump 36, the cooling fan 38, and the thermal exchange plate 40. A battery pack 24 temperature of $T_4$ is a point at which the controller 30 may begin to restrict the power drawn from the battery pack 24 and/or turn off the electrified vehicle 12. In this example, there is no difference in the cooling level between $T_3$ and $T_4$. While example cooling levels have been described, the various cooling levels could be achieved in another manner, such as by varying a speed of the cooling pump 36 and/or the cooling fan 38 between levels.

The manner in which the thermal management system 34 achieves the various cooling levels described above is exemplary only. The thermal management system 34 could achieve the various cooling levels by activating a different combination of components. Further, while a certain number cooling levels and temperature thresholds are shown and described relative to FIG. 2, this disclosure extends to control schemes which include a different number of cooling levels and/or temperature thresholds. Further, while each of the cooling levels is illustrated as a flat line between each corresponding set of temperature thresholds, the cooling levels could vary in proportion to temperature between one or more sets of thresholds. For instance, in FIG. 2, the cooling level between $T_2$ and $T_3$ could be represented by a line with a slope beginning at level 3 cooling at temperature $T_2$ and ending at level 4 cooling at temperature $T_3$.

In this disclosure, when the state of health of the battery pack 24 falls outside the predetermined range, the controller 30 is configured to adjust the temperature thresholds $T_0$-$T_4$. When the state of health of the battery pack 24 falls below the lower threshold curve 46, which may indicate the battery pack 24 is aging faster than expected, the controller 30 is configured to adjust the temperature thresholds $T_0$-$T_4$ to preserve the health of the battery pack 24 with a goal of returning the state of health of the battery pack 24 back to the predefined range. On the other hand, when the state of health of the battery pack 24 exceeds the upper threshold curve 44, which may indicate the battery pack 24 is aging better than expected, the controller 30 is configured to adjust the temperature thresholds $T_0$-$T_4$ to improve the efficiency of the electrified vehicle 12 and/or the battery pack 24 by reducing the energy otherwise allocated to cooling the battery pack 24, thereby taking advantage of the good state of health of the battery pack 24.

Figure 4:
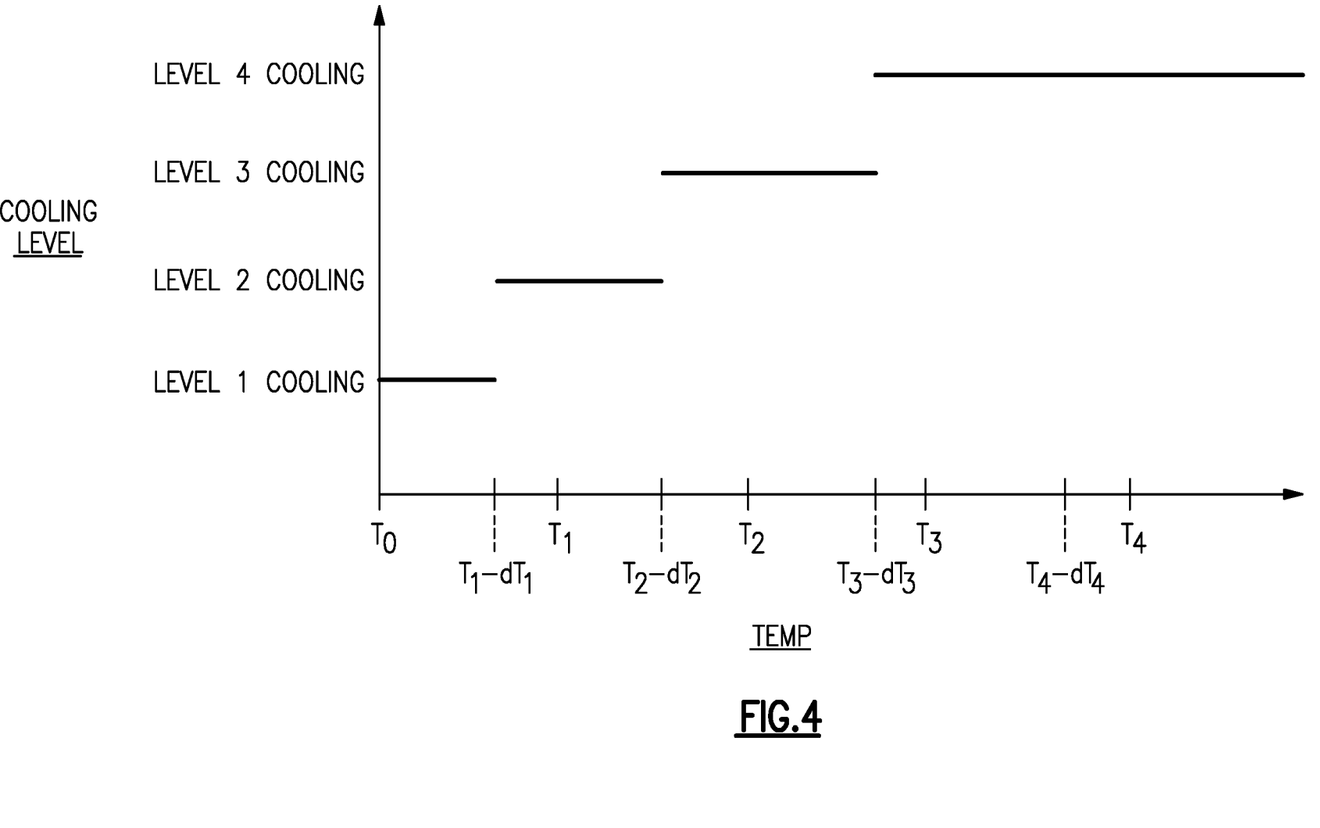
FIG. 4 is a graphical representation of a control scheme for the thermal management system of the battery of the electrified vehicle when the state of health of the battery is below the predefined range.

FIG. 4 is a graphical representation of a control scheme when the state of health of the battery pack 24 is below predefined range, such as a point $P_2$ in FIG. 3. In FIG. 4, the cooling levels remain the same as in the example of FIG. 2. Further, the temperature thresholds $T_0$-$T_4$ of FIG. 2 are shown in FIG. 4. However, the controller 30 adjusts at least some of the temperature thresholds at which the controller 30 triggers the corresponding cooling levels.

In this example, $T_0$ remains unchanged relative to FIG. 2. Thus, in the example of FIG. 4, at temperatures below $T_0$, the controller 30 does not cool the battery pack 24 using the thermal management system 34 and instead applies natural cooling to the battery pack 24. Once the temperature of the battery pack 24 reaches $T_0$, the controller 30 applies the first level of cooling until the temperature of the battery pack 24 reaches a temperature of $T_1$-$dT_1$, at which point the controller 30 commands the thermal management system 34 to apply the second level of cooling. The value of $dT_1$ is an offset determined by the controller 30 according to a technique which will be described below. The controller 30 commands the thermal management system 34 to apply the second level of cooling until the temperature of the battery pack 24 reaches $T_2$-$dT_2$, at which point a third level of cooling is applied. A fourth level of cooling is then applied once the battery pack 24 reaches a temperature of $T_3$-$dT_3$. Finally, a power reduction or cutoff is initiated when the temperature of the battery pack 24 teaches $T_4$-$dT_4$.

The offset values $dT_1$-$dT_4$ are non-zero in this example. In other examples, some of the offset values $dT_1$-$dT_4$ may be zero while at least some others are non-zero. The offset values $dT_1$-$dT_4$ may each be different values such that the temperature thresholds $T_1$-$T_4$ are adjusted by different amounts. For instance, $dT_1$ may be 1° F. while $dT_4$ may be 5° F., depending on the state of health of the battery pack 24 and/or other factors such as present operating conditions of the electrified vehicle 12. Alternatively, the offset values $dT_1$-$dT_4$ may be a common value such that the temperature thresholds $T_1$-$T_4$ are offset by the same amount. Further, while $T_0$ is not adjusted above, it may be adjusted in some other examples.

In an example, the controller 30 is configured to determine the offset values $dT_1$-$dT_4$ by first determining an adjustment level. The adjustment level is a quantity representative of the level of urgency associated with adjusting the temperature thresholds $T_1$-$T_4$. In general, the adjustment level increases as the state of health of the battery pack 24 deviates further from the predefined range, and in particular as the state of health falls below the lower threshold curve 46.

In an example, the adjustment level is based on at least one of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

Relative to the difference between the present battery state of health and an expected battery state of health, the controller 30 may apply the following equation:

$$\text{Adjustment Level} = (SOH_{exp} - SOH_{prst})/SOH_{exp} \quad \text{(Eq. 1)}$$

Where $SOH_{exp}$ is an expected state of health of the battery pack 24 at a particular distance driven or time as indicated by the lower threshold curve 46, and $SOH_{prst}$ is the present state of health of the battery pack 24 at that same distance driven or time. Equation 1 may be performed for both distance driven and time, and the controller 30 may use the greater of those two adjustment levels.

The controller 30 may not use Equation 1 in some examples and instead may derive an adjustment level according to the rate of change, or first derivative, of $SOH_{prst}$ as compared to the rate of change, or first derivative, of $SOH_{exp}$. The controller 30 may alter the adjustment level indicated by Equation 1 based on the comparison of the rates of change to $SOH_{prst}$ and $SOH_{exp}$. The controller 30 may also determine the adjustment level based on a proximity to $D_1$ and/or $X_1$. The controller 30 may use an algorithm or lookup table, and/or combine one, two, or all of these techniques, to determine the adjustment level.

While an example technique for determining the offset values $dT_1$-$T_4$ has been described, it should be understood that this disclosure extends to other techniques, including consideration of other inputs, and the use of different algorithms and/or lookup tables.

Each of the offset values $dT_1$-$T_4$ is determined by the controller 30 using the determined adjustment level. In an example, each of the offset values $dT_1$-$T_4$ is proportional to the adjustment level. In this regard, the offset values $dT_1$-$T_4$ may be determined by multiplying the adjustment level by one or more factors. The factors may be different for each temperature threshold, resulting in different values for $dT_1$-$dT_4$, or may be the same for one or more of the temperature thresholds. The factors may be stored on or accessible to the controller 30. The factors may be determined using an algorithm and/or a lookup table. The algorithm and/or lookup table may consider various inputs, such as present operating conditions of the electrified vehicle 12.

Figure 5:
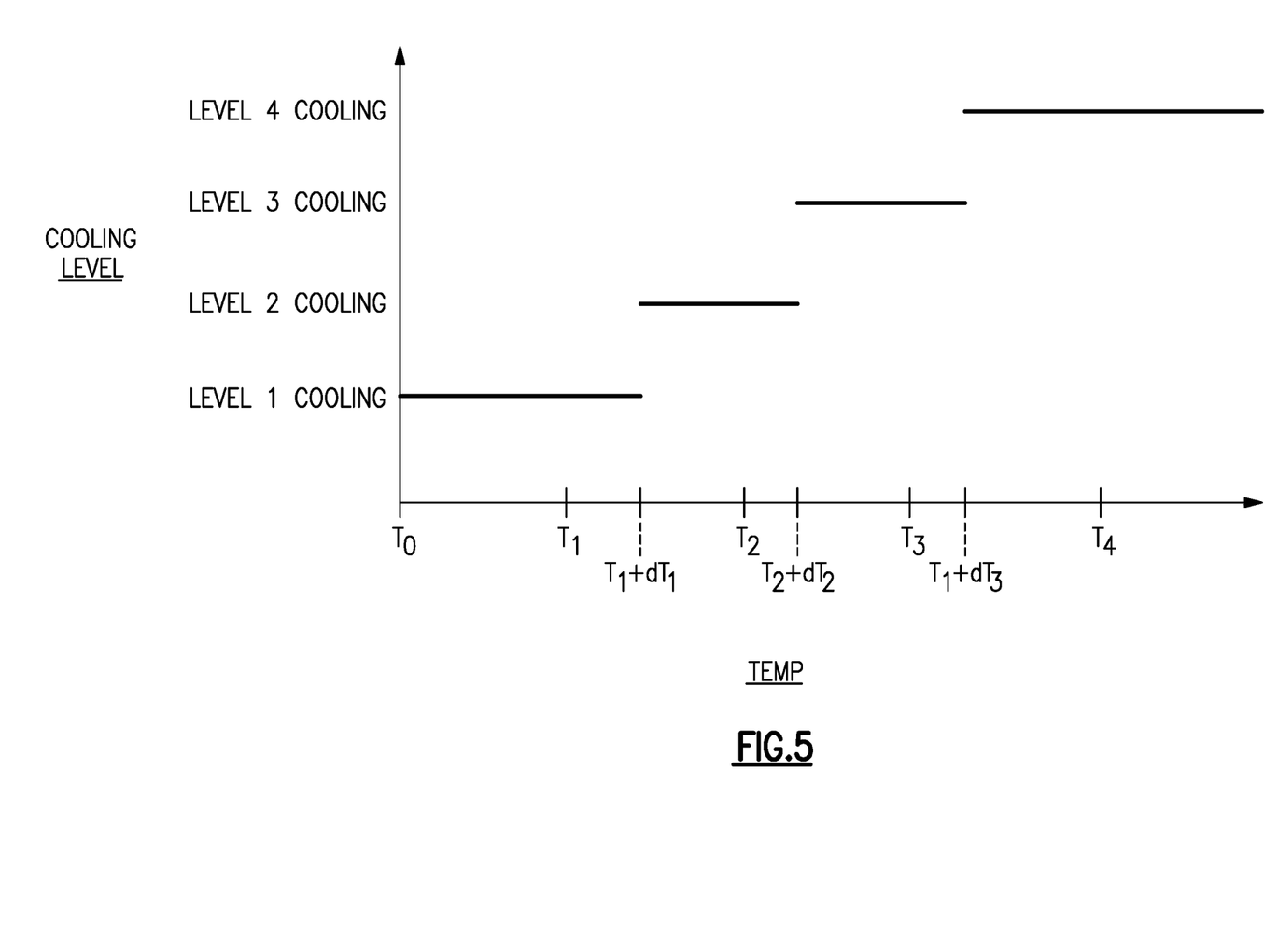
FIG. 5 is a graphical representation of a control scheme for the thermal management system of the battery of the electrified vehicle when the state of health of the battery exceeds the predefined range.

FIG. 5 is a graphical representation of a control scheme when the state of health of the battery pack 24 exceeds the predefined range, such as a point $P_3$ in FIG. 3. In FIG. 5, the cooling levels remain the same as in the example of FIGS. 2 and 4, and the temperature thresholds $T_0$-$T_4$ of FIG. 2 are shown in FIG. 5. As in FIG. 4, the controller 30 adjusts some of the temperature thresholds at which the controller 30 triggers the cooling levels. However, in FIG. 5, at least some of those temperature thresholds are increased as opposed to being decreased, in order to take advantage of the better-than-expected aging of the battery pack 24.

In this example, $T_0$ remains unchanged relative to FIG. 2. Thus, in the example of FIG. 5, at temperatures below $T_0$, the controller 30 does not cool the battery pack 24 using the thermal management system 34 and instead applies natural cooling to the battery pack 24. Once the temperature of the battery pack 24 reaches $T_0$, the controller 30 applies the first level of cooling until the temperature of the battery pack 24 reaches a temperature of $T_1$+$dT_1$, at which point the controller 30 commands the thermal management system 34 to apply the second level of cooling. As in the example of FIG. 4, the value of $dT_1$ is an offset determined by the controller 30 according to a technique which will be described below. The offset values $dT_1$-$dT_3$ referenced in FIG. 5 are not necessarily the same as those in FIG. 4.

With continued reference to FIG. 5, the controller 30 commands the thermal management system 34 to apply the second level of cooling until the temperature of the battery pack 24 reaches $T_2$+$dT_2$, at which point a third level of cooling is applied. A fourth level of cooling is then applied once the battery pack 24 reaches a temperature of $T_3$+$dT_3$. Finally, a power reduction or cutoff is initiated when the temperature of the battery pack 24 teaches $T_4$. Notably, $T_4$ has not been increased relative to FIG. 2 as $T_4$ is an upper limit set by a manufacturer and, in this example, the controller 30 is programmed not to increase it.

The offset values $dT_1$-$dT_3$ in FIG. 5 are non-zero in this example. In other examples, some of the offset values $dT_1$-$dT_3$ may be zero while at least some others are non-zero. The offset values $dT_1$-$dT_3$ may each be different values such that the temperature thresholds $T_1$-$T_3$ are adjusted by different amounts. Alternatively, the offset values $dT_1$-$dT_3$ may be a common value. Further, while $T_0$ is not adjusted in FIG. 5, it may be adjusted in some other examples.

In an example, the controller 30 is configured to determine the offset values $dT_1$-$dT_3$ in a manner substantially similar to FIG. 4 by first determining an adjustment level, which is determined based on at least one of (i) a difference between a present battery state of health and an expected battery state of health, (ii) a difference between a rate of change of a present battery state of health and a rate of change of an expected battery state of health, and (iii) a proximity to a predefined mileage or a predefined time threshold. Once the adjustment level is determined using a technique substantially similar to that described relative to the control scheme of FIG. 4, the controller determines each of the offset values $dT_1$-$dT_3$, which are each proportional to the adjustment level, by multiplying the adjustment level by one or more factors. The factors may be different for each temperature threshold or may be the same for one or more of the temperature thresholds. As with the control scheme of FIG. 4, the factors may be stored on or accessible to the controller 30, and the factors may be determined using an algorithm and/or a lookup table. The algorithm and/or lookup table may consider various inputs, such as present operating conditions of the electrified vehicle 12.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a battery;
   a thermal management system configured to thermally condition the battery at one of a plurality of thermal conditioning levels, wherein each of the thermal conditioning levels corresponds to a respective one of a plurality of battery temperature thresholds; and
   a controller,
   wherein the controller is configured to determine which of the plurality of battery temperature thresholds is met or exceeded based on a temperature of the battery and to command the thermal management system to thermally condition the battery at corresponding one of the plurality of thermal conditioning levels,
   wherein, when a state of health of the battery is outside a predefined range, the controller is configured to adjust each of the plurality of battery temperature thresholds.

2. The electrified vehicle as recited in claim 1, wherein, when the state of health of the battery is outside the predefined range, the controller is configured to adjust each of the plurality of battery temperature thresholds by different amounts.

3. The electrified vehicle as recited in claim 1, wherein, when the state of health of the battery exceeds the predefined range, the controller is configured to increase each of the plurality of battery temperature thresholds.

4. The electrified vehicle as recited in claim 1, wherein, when the state of health of the battery is below the predefined range, the controller is configured to decrease each of the plurality of battery temperature thresholds.

5. The electrified vehicle as recited in claim 1, wherein:
   the controller is configured to adjust the plurality of battery temperature thresholds based on an adjustment level, and
   the adjustment level is based on at least one of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

6. The electrified vehicle as recited in claim 5, wherein the adjustment level is based on at least two of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

7. The electrified vehicle as recited in claim 6, wherein the adjustment level is based on each of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

8. The electrified vehicle as recited in claim 5, wherein:
   when the state of health of the battery is outside the predefined range, the controller is configured to adjust each one of the plurality of battery temperature thresholds by different amounts,
   each one of the different amounts is equal to the adjustment level multiplied by one of a plurality of factors, and
   each one of the plurality of factors corresponds to the respective one of the plurality of battery temperature thresholds.

9. The electrified vehicle as recited in claim 5, wherein, when the state of health of the battery is outside the predefined range, the controller is configured to adjust each one of the plurality of battery temperature thresholds by a common amount in proportion to the adjustment level.

10. The electrified vehicle as recited in claim 5, wherein the predefined mileage and the predefined time thresholds are based on a manufacturer warranty.

11. The electrified vehicle as recited in claim 1, wherein:
    the thermal management system includes a cooling pump, a cooling fan, and a chiller, and
    in each of the plurality of thermal conditioning levels, the controller is configured to selectively activate or deactivate a unique combination of the cooling pump, the cooling fan, and the chiller relative to others of the plurality of thermal conditioning levels.

12. The electrified vehicle as recited in claim 1, wherein:
    the plurality of battery temperature thresholds includes at least four battery temperature thresholds, and
    the plurality of thermal conditioning levels includes at least four thermal conditioning levels.

13. The electrified vehicle as recited in claim 1, wherein the electrified vehicle is a battery electric vehicle.

14. A method, comprising:
    adjusting a plurality of battery temperature thresholds when a state of health of a battery of an electrified vehicle is outside a predefined range; and thermally conditioning the battery at one of a plurality of thermal conditioning levels based on which of the plurality of battery temperature thresholds is met or exceeded, wherein each of the thermal conditioning levels corresponds to a respective one of a plurality of battery temperature thresholds.

15. The method as recited in claim 14, wherein the adjusting step includes adjusting each of the plurality of battery temperature thresholds by different amounts.

16. The method as recited in claim 14, wherein the adjusting step includes increasing each of the plurality of battery temperature thresholds when the state of health of the battery exceeds the predefined range.

17. The method as recited in claim 14, wherein the adjusting step includes decreasing each of the plurality of battery temperature thresholds when the state of health of the battery is below the predefined range.

18. The method as recited in claim 14, wherein:
the adjusting step includes adjusting each of the plurality of battery temperature thresholds based on an adjustment level, and
the adjustment level is based on at least one of (i) a difference between a present battery state of health and an expected battery state of health, (ii) a difference between a rate of change of a present battery state of health and a rate of change of an expected battery state of health, and (iii) a proximity to a predefined mileage or a predefined time threshold.

19. The method as recited in claim 18, wherein:
the adjusting step includes adjusting each one of the plurality of battery temperature thresholds by different amounts,
each one of the different amounts is equal to the adjustment level multiplied by one of a plurality of factors, and
each one of the plurality of factors corresponds to the respective one of the plurality of battery temperature thresholds.

20. The method as recited in claim 14, wherein, in each of the plurality of thermal conditioning levels, the thermally conditioning step includes selectively activating a unique combination of a cooling pump, a cooling fan, and a chiller relative to others of the plurality of thermal conditioning levels.

* * * * *